(12) United States Patent
Resendes et al.

(10) Patent No.: US 7,847,000 B2
(45) Date of Patent: Dec. 7, 2010

(54) SILICA-FILLED ELASTOMERIC COMPOUNDS

(75) Inventors: Rui Resendes, Corunna (CA); Wilfried Braubach, Solingen (DE)

(73) Assignee: LANXESS Inc., Sarnia, Ontario (CA)

( * ) Notice: Subject to any disclaimer, the term of this patent is extended or adjusted under 35 U.S.C. 154(b) by 0 days.

(21) Appl. No.: 10/573,766

(22) PCT Filed: Oct. 21, 2004

(86) PCT No.: PCT/CA2004/001850

§ 371 (c)(1),
(2), (4) Date: Mar. 29, 2006

(87) PCT Pub. No.: WO2005/040272

PCT Pub. Date: May 6, 2005

(65) Prior Publication Data

US 2006/0293423 A1    Dec. 28, 2006

(30) Foreign Application Priority Data

Oct. 24, 2003  (CA)  .................................. 2446474

(51) Int. Cl.
*C08K 5/41*  (2006.01)

(52) U.S. Cl. .................. 524/155; 524/493; 524/543
(58) Field of Classification Search ................ 524/155, 524/493, 543
See application file for complete search history.

(56) References Cited

U.S. PATENT DOCUMENTS

| | | | |
|---|---|---|---|
| 5,698,619 A | 12/1997 | Cohen et al. | 524/188 |
| 6,127,468 A | 10/2000 | Cruse et al. | 524/225 |
| 6,180,710 B1 * | 1/2001 | Hergenrother et al. | 524/494 |
| 6,608,125 B2 * | 8/2003 | Cruse et al. | 524/262 |
| 6,706,804 B2 * | 3/2004 | Resendes | 524/552 |
| 6,710,116 B1 | 3/2004 | Waddell et al. | 524/515 |
| 2001/0009948 A1 | 7/2001 | Hopkins et al. | 525/330.7 |
| 2002/0132904 A1 | 9/2002 | Langstein et al. | 524/495 |
| 2002/0198305 A1 | 12/2002 | Hopkins | 524/492 |
| 2005/0075422 A1 | 4/2005 | Resendes et al. | 523/210 |

* cited by examiner

*Primary Examiner*—Robert D. Harlan
(74) *Attorney, Agent, or Firm*—Michael A. Miller

(57) ABSTRACT

The present invention provides a composition comprising at least one halobutyl elastomer, at least one mineral filler and at least one protected thiol modifier. In another aspect the present invention provides a process which comprises mixing a halobutyl elastomer with at least one mineral filler, in the presence of at least one protected thiol modifier, and curing the resulting filled halobutyl elastomer.

7 Claims, No Drawings

SILICA-FILLED ELASTOMERIC COMPOUNDS

FIELD OF THE INVENTION

The present invention relates to silica-filled halogenated butyl elastomers, in particular bromobutyl elastomers (BIIR).

BACKGROUND OF THE INVENTION

It is known that reinforcing fillers such as carbon black and silica greatly improve the strength and fatigue properties of elastomeric compounds. It is also known that chemical interaction occurs between the elastomer and the filler. For example, good interaction between filler, in particular carbon black and highly unsaturated elastomers such as polybutadiene (BR) and styrene butadiene copolymers (SBR) occurs because of the large number of carbon-carbon double bonds present in these copolymers. Butyl elastomers are known to interact poorly with fillers like carbon black. For example, a compound prepared by mixing carbon black with a combination of BR and butyl elastomers results in domains of BR, which contain most of the carbon black, and butyl domains-which contain very little carbon black. It is also known that butyl compounds have poor abrasion resistance.

WO-99/09036-A1 discloses protected thiol modifiers in general and also their use in silica filled compound comprising organic polymers. However, this reference is silent about the beneficial use of protected thiol modifiers in compounds comprising halogenated butyl rubbers. Butyl elastomers may have only one tenth, or fewer, of the carbon-carbon double bonds found in BR or SBR as disclosed in WO-99/09036-A1. Thus, our findings that the use of protected thiol modifiers in fact results in compounds with a very good balance of physical properties while still maintaining acceptable levels of processability is surprising.

SUMMARY OF THE INVENTION

The present invention provides a composition comprising at least one halobutyl elastomer, at least one mineral filler and at least one protected thiol modifier.

It has been discovered that protected thiol modifiers enhance the interaction of halobutyl elastomers with mineral fillers, resulting in improved compound properties such as tensile strength and abrasion resistance (DIN). This is surprising as the non-halogenated butyl elastomer does not respond in the same way.

Accordingly, in another aspect the present invention provides a process which comprises mixing a halobutyl elastomer with at least one mineral filler, in the presence of at least one protected thiol modifier, and curing the resulting filled halobutyl elastomer.

The halobutyl elastomer that is admixed with one protected thiol modifier may be a mixture with another elastomer or elastomeric compound. The halobutyl elastomer should constitute more than 5% of any such mixture. Preferably the halobutyl elastomer should constitute at least 10% of any such mixture. In some cases it is, preferred not to use mixtures but to use the halobutyl elastomer as the sole elastomer. If mixtures are to be used, however, then the other elastomer may be, for example, natural rubber, polybutadiene, styrene-butadiene or poly-chloroprene or an elastomer compound containing one or more of these elastomers.

The filled halobutyl elastomer can be cured in the presence of at least one cross-linking agent to obtain a product which has improved properties, for instance in abrasion resistance, rolling resistance and traction. Curing can be effected with sulfur but does not have to be. The preferred amount of sulfur is in the range of from 0 to 2.0 parts by weight per hundred parts of rubber. An activator, for example zinc oxide, may also be used, in an amount in the range of from 0.5 parts to 2 parts by weight. Other ingredients, for instance stearic acid, antioxidants, or accelerators may also be added to the elastomer prior to curing. Sulphur curing is then effected in the known manner. See, for instance, chapter 2, "The Compounding and Vulcanization of Rubber", of "Rubber Technology", $3^{rd}$ edition, published by Chapman & Hall, 1995, the disclosure of which is incorporated by reference.

Other curatives known to cure halobutyl elastomers may also be used. A number of compounds are known to cure halobutyl elastomers, for example, such as bis dieneophiles (for example m-phenyl-bis-maleimide, HVA2), phenolic resins, amines, amino-acids, peroxides, zinc oxide and the like. Combinations of the aforementioned curatives may also be used.

The mineral-filled halobutyl elastomer of the invention can be admixed with other elastomers or elastomeric compounds before it is subjected to curing.

DETAILED DESCRIPTION OF THE INVENTION

The phrase "halobutyl elastomer(s)" as used herein refers to a chlorinated or brominated butyl elastomer. Brominated butyl elastomers are preferred, and the invention is illustrated, by way of example, with reference to such bromobutyl elastomers. It should be understood, however, that the invention extends to the use of chlorinated butyl elastomers.

Thus, halobutyl elastomers suitable for use in the practice of this invention include, but are not limited to, brominated butyl elastomers. Such elastomers may be obtained by bromination of butyl rubber (which is a copolymer of isobutylene and a co-monomer that is usually a $C_4$ to $C_6$ conjugated diolefin, preferably isoprene—(brominated isobutene-isoprene-copolymers BIIR)). Co-monomers other than conjugated diolefins can be used, however, and mention is made of alkyl-substituted vinyl aromatic co-monomers such as $C_1$-$C_4$-alkyl substituted styrene. An example of such an elastomer which is commercially available is brominated isobutylene methylstyrene copolymer (BIMS) in which the co-monomer is p-methylstyrene.

Brominated butyl elastomers typically comprise in the range of from 0.1 to 10 weight percent of repeating units derived from isoprene and in the range of from 90 to 99.9 weight percent of repeating units derived from isobutylene (based upon the hydrocarbon content of the polymer) and in the range of from 0.1 to 9 weight percent bromine (based upon the bromobutyl polymer). A typical bromobutyl polymer has a molecular weight, expressed as the Mooney viscosity according to DIN 53 523 (ML 1+8 at 125° C.), in the range of from 25 to 60.

For use in the present invention the brominated butyl elastomer preferably contains in the range of from 0.5 to 5 weight percent of repeating units derived from isoprene and in the range of from 95 to 99.5 weight percent of repeating units derived from isobutylene (based upon the hydrocarbon content of the polymer) and in the range of from 0.2 to 3 weight percent, preferably from 0.75 to 2.3 weight percent, of bromine (based upon the brominated butyl polymer).

A stabilizer may be added to the brominated butyl elastomer. Suitable stabilizers include calcium stearate and epoxidized soy bean oil, preferably used in an amount in the range of from 0.5 to 5 parts by weight per 100 parts by weight of the brominated butyl rubber (phr).

Examples of suitable brominated butyl elastomers include Bayer Bromobutyl® 2030, Bayer Bromobutyl® 2040 (BB2040), and Bayer Bromobutyl® X2 commercially available from Bayer. Bayer BB2040 has a Mooney viscosity (ML 1+8@125° C.) of 39±4, a bromine content of 2.0±0.3 wt % and an approximate molecular weight of 500,000 grams per mole.

The brominated butyl elastomer used in this invention may also be a graft copolymer of a brominated butyl rubber and a polymer based upon a conjugated diolefin monomer. Our co-pending Canadian Patent Application 2,279,085 is directed towards a process for preparing such graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The disclosure of this application is incorporated herein by reference. The bromobutyl elastomer of the graft copolymer can be any of those described above. The conjugated diolefins that can be incorporated in the graft copolymer generally have the structural formula:

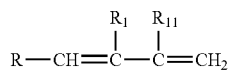

wherein R is a hydrogen atom or an alkyl group containing from 1 to 8 carbon atoms and wherein $R_1$ and $R_{11}$ can be the same or different and are selected from the group consisting of hydrogen atoms and alkyl groups containing from 1 to 4 carbon atoms. Some representative non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing from 4 to 8 carbon atoms are preferred, 1,3-butadiene and isoprene being especially preferred.

The polymer based on a conjugated diene monomer can be a homopolymer, or a copolymer of two or more conjugated diene monomers, or a copolymer with a vinyl aromatic monomer.

The vinyl aromatic monomers which can optionally be used are selected so as to be copolymerizable with the conjugated diolefin monomers being employed. Generally, any vinyl aromatic monomer which is known to polymerize with organo-alkali metal initiators can be used. Such vinyl aromatic monomers usually contain in the range of from 8 to 20 carbon atoms, preferably from 8 to 14 carbon atoms. Some examples of vinyl aromatic monomers which can be so copolymerized include styrene, alpha-methyl styrene, various alkyl styrenes including p-methylstyrene, p-methoxy styrene, 1-vinyinaphthalene, 2-vinyl naphthalene, 4-vinyl toluene and the like. Styrene is preferred for copolymerization with 1,3-butadiene alone or for terpolymerization with both 1,3-butadiene and isoprene.

The halogenated butyl elastomer may be used alone or in combination with other elastomers such as:

BR—polybutadiene
ABR—butadiene/$C_1$-$C_4$ alkyl acrylate copolymers
CR—polychloroprene
IR—polyisoprene
SBR—styreneibutadiene copolymers with styrene contents of 1 to 60, preferably 20 to 50 wt. %
IIR—isobutylene/isoprene copolymers
NBR—butadiene/acrylonitrile copolymers with acrylonitrile contents of 5 to 60, preferably 10 to 40 wt. %
HNBR—partially hydrogenated or completely hydrogenated NBR
EPDM—ethylene/propylene/diene copolymers The filler is composed of particles of a mineral, and examples include silica, silicates, clay (such as bentonite), gypsum, alumina, titanium dioxide, talc and the like, as well as mixtures thereof.

Further examples are:

highly disperse silicas, prepared e.g. by the precipitation of silicate solutions or the flame hydrolysis of silicon halides, with specific surface areas of 5 to 1000, preferably 20 to 400 m$^2$/g (BET specific surface area), and with primary particle sizes of 10 to 400 nm; the silicas can optionally also be present as mixed oxides with other metal oxides such as those of Al, Mg, Ca, Ba, Zn, Zr and Ti;

synthetic silicates, such as aluminum silicate and alkaline earth metal silicate like magnesium silicate or calcium silicate, with BET specific surface areas of 20 to 400 m$^2$/g and primary particle diameters of 10 to 400 nm;

natural silicates, such as kaolin and other naturally occurring silica;

glass fibres and glass fibre products (mafting, extrudates) or glass microspheres;

metal oxides, such as zinc oxide, calcium oxide, magnesium oxide and aluminium oxide;

metal carbonates, such as magnesium carbonate, calcium carbonate and zinc carbonate;

metal hydroxides, e.g. aluminium hydroxide and magnesium hydroxide; or combinations thereof.

These mineral particles have hydroxyl groups on their surface, rendering them hydrophilic and oleophobic. This exacerbates the difficulty of achieving good interaction between the filler particles and the butyl elastomer. For many purposes, the preferred mineral is silica, especially silica prepared by the carbon dioxide precipitation of sodium silicate.

Dried amorphous silica particles suitable for use in accordance with the invention have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N, from Bayer AG.

Those mineral filler can may be used in combination with known non-mineral fillers, such as carbon blacks; the carbon blacks to be used here are prepared by the lamp black, furnace black or gas black process and have. BET specific surface areas of 20 to 200 m$^2$/g, e.g. SAF, ISAF, HAF, FEF or GPF carbon blacks; or rubber gels, especially those based on polybutadiene, butadiene/styrene copolymers, butadiene/acrylonitrile copolymers and polychloroprene.

Non-mineral fillers are not normally used as filler in the halobutyl elastomer compositions of the invention, but in some embodiments they may be present in an amount up to 40 phr. It is preferred that the mineral filler should constitute at least 55% by weight of the total amount of filler. If the halobutyl elastomer composition of the invention is blended with another elastomeric composition, that other composition may contain mineral and/or non-mineral fillers.

The protected thiol modifier preferably comprises at least one silicon and one sulfur atom. Examples of suitable protected thiol modifiers are disclosed in WO-99/09036-A1 which hereby is incorporated by reference with regards to jurisdictions allowing for this feature.

Preferred are blocked mercaptosilanes selected from the group consisting of

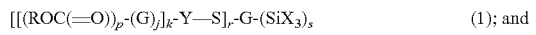  (1); and

  (2)

wherein

Y is a polyvalent species $(Q)_zA(=E)$ selected from the group consisting of

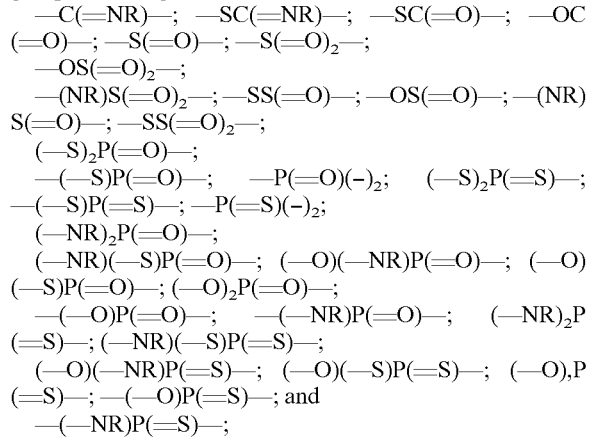

each wherein the atom (A) attached to the unsaturated heteroatom (E) is attached to the sulfur, which in turn is linked via a group G to the silicon atom;

each R is chosen independently from hydrogen, straight, cyclic or branched alkyl that may or may not contain unsaturation, alkenyl groups, aryl groups, and aralkyl groups, with each R containing from 1 to 18 carbon atoms;

each G is independently a monovalent or polyvalent group derived by substitution of alkyl, alkenyl, aryl or aralkyl wherein G can contain from 1 to 18 carbon atoms, with the proviso that G is not such that the silane would contain an alpha,beta-unsaturated carbonyl including a carbon-carbon double bond next to the thiocarbonyl group, and if G is univalent, G can be a hydrogen atom;

X is independently a group selected from the group consisting of —Cl, —Br, RO—, RC(=O)O—, $R_2C$=NO—, $R_2NO$— or $R_3N$—, $R_3$—$(OSiR_3)_t(OSiR_3)$ wherein each R and G is as above and at least one X is not —R;

p is 0 to 5; r is 1 to 3; z is 0 to 2; q is 0 to 6; a is 0 to 7; b is 1 to 3; j is 0 to 1, but it may be 0 only if p is 1, c is 1 to 6, t is 0 to 5; s is 1 to 3; k is 1 to 2, with the provisos that (A) if A is carbon, sulfur or sulfonyl, then (i) a+b=2 and (ii) k=1;

(B) if A is phosphorus, then a+b=3 unless both (i) c>1 and (ii) b=1, in which case a=c+1; and (C) if A is phosphorus, then k is 2.

Specific examples of protected thiol modifier comprise thioacetic acid S-trimethoxysilyl-methyl ester, thioacetic acid S-triethoxysilyl-methyl ester, thioacetic acid S-(2-trimethoxylsilyl-ethyl)ester, thioacetic acid S-(2-triethoxysilyl-ethyl)ester, thioacetic acid S-(3-trimethoxysilyl-propyl)ester, thioacetic acid S-(3-triethoxysilyl-propyl)ester, thiopropionic acid S-trimethoxylsilyl-methyl ester, thiopropionic acid S-triethoxylsilyl-methyl ester, thiopropionic acid S-(2-trimethoxylsilyl-ethyl)ester, thiopropionic acid S-(2-triethoxylsilyl-ethyl)ester, thiopropionic acid S-(3-trimethoxylsilyl-propyl)ester, thiopropionic acid S-(3-triethoxylsilyl-propyl) ester, thiobutyric acid S-trimethoxysilyl-methyl ester, thiobutyric acid S-triethoxysilyl-methyl ester, thiobutyric acid S-(2-trimethoxysilyl-ethyl)ester, thiobutyric acid S-(2-triethoxysilyl-ethyl)ester, thiobutyric acid S-(3-trimethoxysilyl-propyl)ester, thiobutyric acid S-(3-triethoxysilyl-propyl)ester, pentanethioic acid S-trimethoxysilyl-methyl ester, pentanethioic acid S-triethoxysilyl-methyl ester, pentanethioic acid S-(2-trimethoxysilyl-ethyl)ester, pentanethioic acid S-(2-triethoxysilyl-ethyl)ester, pentanethioic acid S-(3-trimethoxysilyl-propyl)ester, and pentanethioic acid S-(3-triethoxysilyl-propyl)ester. Preferred are pentanethioic acid S-(3-trimethoxysilyl-propyl)ester, and pentanethioic acid S-(3-triethoxysilyl-propyl)ester.

Preferably, the inventive compound comprises in the range of from 0.5 to 10 phr of one or more protected thiol modifiers, more preferably in the range of from 1 to 5 phr.

It may be advantageous to add one or more silazane compounds to the inventive compound. These siliazane compound(s) can have one or more silazane groups, e.g. disilazanes. Organic silazane compounds are preferred. Examples include but are not limited to hexamethyldisilazane, heptamethyl-disilazane, 1,1,3,3-tetramethyldisilazane, 1,3-bis(chloromethyl)tetramethyldisilazane, 1,3-divinyl-1,1,3,3-tetramethyldisilazane, and 1,3-diphenyltetramethyl-disilazane.

It may further be advantageous to further add additives which give enhanced physical properties to the inventive compound such as hydroxyl- and amine-containing additives. Examples of hydroxyl- and amine-containing additives include proteins, aspartic acid, 6-aminocaproic acid, diethanolamine and triethanolamine. Preferably, the hydroxyl- and amine-containing additive should contain a primary alcohol group and an amine group separated by methylene bridges, which may be branched. Such compounds have the general formula $HO-A-NH_2$; wherein A represents a $C_1$ to $C_{20}$ alkylene group, which may be linear or branched.

More preferably, the number of methylene groups between the two functional groups should be in the range of from 1 to 4. Examples of preferred additives include monoethanolamine and N,N-dimethylaminoalcohol.

The amount of filler to be incorporated into the inventive halobutyl rubber/elastomer compound can vary between wide limits. Typical amounts of filler range from 20 parts to 250 parts by weight, preferably from 30 parts to 100 parts, more preferably from 40 to 80 parts per hundred parts of elastomer. The amount of the silazane compound is preferably in the range of from 0.5 to 10 parts per hundred parts of elastomer, preferably of from 1 to 6, more preferably of from 2 to 5 parts per hundred parts of elastomer. The amount of hydroxyl- and amine-containing additive used in conjunction with the silazane compound is typically in the range of from 0.5 to 10 parts per hundred parts of elastomer, preferably of from 1 to 3 parts per hundred parts of elastomer.

Furthermore up to 40 parts of processing oil, preferably from 5 to 20 parts, per hundred parts of elastomer, may be present. Further, a lubricant, for example a fatty acid such as stearic acid, may be present in an amount up to 3 parts by weight, more preferably in an amount up to 2 parts by weight.

The halobutyl rubber(s)/elastomer(s), filler(s), protected thiol modifier(s) and optional further additive(s) are mixed together, suitably at a temperature in the range of from 25 to 200° C. It is preferred that the temperature in one of the mixing stages be greater than 60° C., and a temperature in the range of from 90 to 150° C. is particularly preferred. Normally the mixing time does not exceed one hour; a time in the range from 2 to 30 minutes is usually adequate. The mixing is suitably carried out on a two-roll mill mixer, which provides good dispersion of the filler within the elastomer. Mixing may also be carried out in a Banbury mixer, or in a Haake or Brabender miniature internal mixer. An extruder also provides good mixing, and has the further advantage that it permits shorter mixing times. It is also possible to carry out the mixing in two or more stages. Further, the mixing can be carried out in different apparatuses, for example one stage may be carried out in an internal mixer and another in an extruder.

The enhanced interaction between the filler and the halobutyl elastomer results in improved properties for the filled elastomer. These improved properties include higher tensile strength, higher abrasion resistance, lower permeability and better dynamic properties. These render the filled elastomers particularly suitable for a number of applications, including, but not limited to, use in tire treads and tire sidewalls, tire innerliners, tank linings, hoses, rollers, conveyor belts, curing bladders, gas masks, pharmaceutical enclosures and gaskets.

In a preferred embodiment of the invention, bromobutyl elastomer, silica particles, protected thiol modifier(s) and, optionally, further additives and/or, optionally, processing oil extender are mixed on a two-roll mill at a nominal mill temperature of 25° C. The mixed compound is then placed on a two-roll mill and mixed at a temperature above 60° C. It is preferred that the temperature of the mixing is not too high, and more preferably does not exceed 150° C., since higher temperatures may cause curing to proceed undesirably far and thus impede subsequent processing. The product of mixing these four ingredients at a temperature not exceeding 150° C. is a compound which has good stress/strain properties and which can be readily processed further on a warm mill with the addition of curatives.

The filled halobutyl rubber compositions of the invention, and in particular filled bromobutyl rubber compositions, find many uses, but mention is made particularly of use in tire tread compositions. Important features of a tire tread composition are that it shall have low rolling resistance, good traction, particularly in the wet, and good abrasion resistance so that it is resistant to wear. Compositions of the invention display these desirable properties. Thus, an indicator of traction is tan δ at 0° C., with a high tan δ at 0° C. correlating with good traction. An indicator of rolling resistance is tan δ at 60° C., with a low tan δ at 60° C. correlating with low rolling resistance. Rolling resistance is a measure of the resistance to forward movement of the tire, and low rolling resistance is desired to reduce fuel consumption. Low values of loss modulus at 60° C. are also indicators of low rolling resistance. As is demonstrated in the examples below, compositions of the invention display high tan δ at 0° C., low tan δ at 60° C. and low loss modulus at 60° C.

The invention is further illustrated in the following examples.

EXAMPLES

Description of Tests

Abrasion Resistance:
DIN 53-516 (60 grit Emery paper)

Physical Testing:
Stress-Strain measurements were determined at 23° C. on an Instron 4501 according to ASTM 412 Method A. Samples for Stress-Strain measurements were cut from a 2 mm macro sheet, cured for tc90+5 minutes, using Die C. Hardness values were determined with the use of a Shore A2 Tester according to ASTM 2240.

Dynamic Property Testing:
Dynamic testing (tan δ at 0° C. and 60° C., Loss modulus at 60° C.) were carried out using the GABO. The GABO is a dynamic mechanical analyzer for characterizing the properties of vulcanized elastomeric materials. The dynamic mechanical properties give a measure of traction with the best traction usually obtained with high values of tan δ at 0° C. Low values of tan δ at 60° C., and in particular, low loss moduli at 60° C. are indicators of low rolling resistance.

Cure Rheometry:
ASTM D 52-89 MDR2000E Rheometer at 1° arc and 1.7 Hz

Description of Ingredients:
BB2030—Bayer® Bromobutyl™ 2030—available from Bayer Inc.
RB301—Bayer® Butyl™ 301—non-halogenated Butyl available from Bayer Inc.
Hi-Sil® 233—silica—a product of PPG
NXT Silane—Pentanethioic acid S-(3-triethoxysilyl-propyl)ester a product of OSI
Maglite® D—magnesium oxide a product of CP Hall
HVA #2—m-phenyl-bis-maleimide—available from Dupont Canada Inc.
Stearic acid—available from H.M. Royal.
Sulfur NBS—available from Akron Rubber Development Laboratory Inc.
Zinc oxide—available from St. Lawrence Chem. Co. Ltd.

Examples 1-7

The effect of incorporation of protected thiol modifier(s) into halogenated butyl elastomer/silica compounds was investigated via the formulation of several compounds of which NXT Silane was incorporated as the protected thiol modifier. For comparison, a halogenated butyl elastomer/silica compound (Example 1) with no silane and several non-halogenated butyl elastomer/silica compounds (Examples 3, 5 and 7) were also prepared as control compounds. The amount of ingredients used is shown in Table 1.

Examples 1-7 were prepared with the use of two roll, 6×12 inch Mill operating with a roll temperature of 30° C. The compounds were prepared according to the following mixing sequence:
t=0 min: Add 1A+1B*
t=2 min: Add 1C*
t=3 min: Sweep
t=4 min: Sweep
t=5 min: Dump
* as indicated in Table 1 in column "steps"

Each of these compounds was then heat treated (banding with a tight nip setting) on a two roll, 6×12 in Mill operating with a roll temperature of 100° C. for a total of 10 minutes. Following the heat treatment, the curatives (2A) were added to the room temperature compounds with the use of a two roll 6×12 in Mill operating with a roll temperature of 30° C. The compounds were refined with six endwise passes.

TABLE 1

Test Formulations in phr (per hundred rubber).

| | Step* | Exp. 1 | Exp. 2 | Exp. 3 | Exp. 4 | Exp. 5 | Exp. 6 | Exp. 7 |
|---|---|---|---|---|---|---|---|---|
| BB2030 | 1A | 100 | 100 | | 100 | | 100 | |
| RB301 | 1A | | | 100 | | 100 | | 100 |
| HI-SIL 233 | 1B | 30 | 30 | 30 | 30 | 30 | 30 | 30 |
| MAGLITE D | 1B | 1 | 1 | 1 | 1 | 1 | 1 | 1 |
| NXT SILANE | 1B | | 2.4 | 2.4 | 2.4 | 2.4 | 2.4 | 2.4 |
| HI-SIL 233 | 1C | 30 | 30 | 30 | 30 | 30 | 30 | 30 |
| NXT SILANE | 1C | | 2.4 | 2.4 | 2.4 | 2.4 | 2.4 | 2.4 |
| HVA #2 | 2A | | | | 2 | 2 | | |
| STEARIC ACID | 2A | 1 | 1 | 1 | | | | |
| SULFUR NBS | 2A | 0.5 | 0.5 | 0.5 | | | 1 | 1 |
| ZINC OXIDE | 2A | 1.5 | 1.5 | 1.5 | 1 | 1 | 3 | 3 |

*Mixing step as referred to above

The physical properties of the compounds of Examples 1-7 were investigated and are listed in Table 2.

TABLE 2

Test Compound Physical Properties.

| | Exp. 1 | Exp. 2 | Exp. 3 | Exp. 4 | Exp. 5 | Exp. 6 | Exp. 7 |
|---|---|---|---|---|---|---|---|
| STRESS STRAIN (DUMBELLS) | | | | | | | |
| Dumbell | Die C | Die C | Die C | Die C | Die C | Die C | Die C |
| Test Temperature (° C.) | 23 | 23 | 23 | 23 | 23 | 23 | 23 |
| Hardness Shore A2 (pts.) | 67 | 57 | 47 | 63 | 46 | 55 | 50 |
| Ultimate Tensile (MPa) | 7.56 | 17.02 | 1.94 | 17.07 | 0.375 | 18.25 | 4.03 |
| Ultimate Elongation (%) | 715 | 449 | DNB | 283 | DNB | 450 | DNB |
| Stress @ 25 (MPa) | 1.43 | 0.973 | 0.686 | 1.21 | 0.736 | 0.968 | 0.716 |
| Stress @ 50 (MPa) | 1.36 | 1.27 | 0.705 | 1.87 | 0.687 | 1.26 | 0.781 |
| Stress @ 100 (MPa) | 1.35 | 1.93 | 0.695 | 3.8 | 0.571 | 1.99 | 0.816 |
| Stress @ 200 (MPa) | 1.75 | 5.06 | 0.682 | 10.62 | 0.451 | 5.54 | 0.932 |
| Stress @ 300 (MPa) | 2.57 | 10.45 | 0.729 | | 0.42 | 11.35 | 1.18 |
| DIN ABRASION | | | | | | | |
| Abrasion Volume Loss (mm$^3$) | 418 | 209 | TSTT | 177 | TSTT | 193 | TSTT |
| MDR CURE CHARACTERISTICS | | | | | | | |
| Frequency (Hz) | 1.7 | 1.7 | 1.7 | 1.7 | 1.7 | 1.7 | 1.7 |
| Test Temperature (° C.) | 170 | 160 | 160 | 160 | 160 | 160 | 160 |
| Degree Arc (°) | 1 | 1 | 1 | 1 | 1 | 1 | 1 |
| Test Duration (min) | 60 | 60 | 60 | 60 | 60 | 60 | 60 |
| Torque Range (dN.m) | 100 | 100 | 100 | 100 | 100 | 100 | 100 |
| Chart No. | 654 | 542 | 543 | 544 | 545 | 546 | 547 |
| MH (dN.m) | 26.14 | 22.94 | 10.26 | 30.48 | 8.09 | 24.59 | 11.36 |
| ML (dN.m) | 13.8 | 4.2 | 5.47 | 5.92 | 5.51 | 4.28 | 5.74 |
| Delta MH-ML (dN.m) | 12.34 | 18.74 | 4.79 | 24.56 | 2.58 | 20.31 | 5.62 |
| ts 1 (min) | 0.3 | 0.96 | 4.32 | 0.84 | 29.34 | 0.96 | 4.8 |
| ts 2 (min) | 0.36 | 1.5 | 11.22 | 1.56 | 48.24 | 1.56 | 10.38 |
| t' 10 (min) | 0.27 | 1.41 | 1.73 | 2.11 | 9.11 | 1.54 | 2.86 |
| t' 25 (min) | 0.47 | 3.18 | 5.48 | 7.23 | 20.67 | 3.46 | 6.87 |
| t' 50 (min) | 4.14 | 8.41 | 14.85 | 16.62 | 34.92 | 8.93 | 16.44 |
| t' 90 (min) | 37.47 | 31.48 | 45.25 | 39.79 | 54.43 | 27.42 | 46.73 |
| t' 95 (min) | 48.01 | 39.01 | 51.6 | 47.92 | 57.31 | 32.98 | 52.85 |
| DYNAMIC TESTING | | | | | | | |
| tan δ (0° C.) | | 0.621 | 0.631 | | | | |
| tan δ (60° C.) | | 0.163 | 0.135 | | | | |
| E" (60° C.) (MPa) | | 1.311 | 0.651 | | | | |

Note:
TSTT = To Soft To Test. Compounds denoted as TSTT were deemed too soft to be tested by DIN 53-516. DNB = Did Not Break. Compounds denoted as DNB possessed ultimate elongations which exceeded the upper limit of the Instron 4501, operating according to ASTM 412 Method A.

As can be seen from the data presented in Table 2, the physical properties of the compounds based on halogenated butyl (BB2030) are significantly superior to those measured for compounds based on non-halogenated butyl (RB301). Regardless of which curative package was employed, the enhanced reactivity of compounds based on halogenated butyl (BB2030) compared to compounds based on non-halogenated butyl (RB301) allowed for the attainment of excellent physical properties in the final compound. Specifically, compounds which were based on RB301 (Examples 3, 5 and 7) possessed significantly poorer abrasion resistance (in fact these compounds were too soft to be tested) indexes compared to their BB2030 analogues (Examples 2, 4 and 6). The significantly lower values of the modulus at 300% elongation for Examples 3, 5 and 7 c.f. Examples 2, 4 and 6 is yet a further indication of the poor degree of filler interaction (and thus physical reinforcement) present in these formulations.

The invention claimed is:

1. A filled halobutyl elastomer composition comprising at least one halobutyl elastomer, at least one mineral filler, wherein the mineral filler is selected from the group consisting of highly dispersed silica prepared by the precipitation of silicate solutions or the flame hydrolysis of silicon halides, silicates, gypsum, alumina, titanium dioxide, talc, and mixtures thereof, and at least one protected thiol modifier.

2. The filled halobutyl elastomer composition according to claim 1 wherein the halobutyl elastomer is a Bromobutyl elastomer.

3. The filled halobutyl elastomer composition according to claim 1 wherein the mineral filler is highly dispersed silica prepared by the precipitation of silicate solutions or the flame hydrolysis of silicon halides.

4. The filled halobutyl elastomer composition according to claim 1 wherein the at least one protected thiol modifier is a blocked mercaptosilane.

5. The filled halobutyl elastomer composition according to claim 1 wherein the at least one protected thiol modifier is selected from the group consisting of thioacetic acid S-trimethoxysilyl-methyl ester, thioacetic acid S-triethoxysilyl-methyl ester, thioacetic acid S-(2-trimethoxylsilyl-ethyl)ester, thioacetic acid S-(2-triethoxysilyl-ethyl)ester, thioacetic acid S-(3-trimethoxysilyl-propyl)ester, thioacetic acid S-(3-triethoxysilyl-propyl)ester, thiopropionic acid S-trimethoxylsilyl-methyl ester, thiopropionic acid S-triethoxylsilyl-methyl ester, thiopropionic acid S-(2-trimethoxylsilyl-ethyl) ester, thiopropionic acid S-(2-triethoxylsilyl-ethyl)ester, thiopropionic acid S-(3-trimethoxylsilyl-propyl)ester, thiopropionic acid S-(3-triethoxylsilyl-propyl)ester, thiobutyric acid S-trimethoxysilyl-methyl ester, thiobutyric acid S-triethoxysilyl-methyl ester, thiobutyric acid S-(2-trimethoxysilyl-ethyl)ester, thiobutyric acid S-(2-triethoxysilyl-ethyl)ester, thiobutyric acid S-(3-trimethoxysilyl-propyl)ester, thiobutyric acid S-(3-triethoxysilyl-propyl)ester, pentanethioic acid S-trimethoxysilyl-methyl ester, pentanethioic acid S-triethoxysilyl-methyl ester, pentanethioic acid S-(2-trimethoxysilyl-ethyl)ester, pentanethioic acid S-(2-triethoxysilyl-ethyl)ester, pentanethioic acid S-(3-trimethoxysilyl-propyl)ester, pentanethioic acid S-(3-triethoxysilyl-propyl) ester and mixtures thereof.

6. A process for preparing a filled halobutyl elastomer which comprises:
    admixing at least one halobutyl elastomer, at least one mineral filler, wherein the mineral filler is selected from the group consisting of highly dispersed silica prepared by the precipitation of silicate solutions or the flame hydrolysis of silicon halides, silicates, gypsum, alumina, titanium dioxide, talc, and mixtures thereof, at least one protected thiol modifier and at least one cross-linking agent; and
    curing the resulting admixture to make the filled halobutyl elastomer.

7. A method for improving the abrasion resistance of a filled, cured elastomer composition comprising:
    providing at least one halogenated butyl elastomer comprising at least one mineral filler, wherein the mineral filler is selected from the group consisting of highly dispersed silica prepared by the precipitation of silicate solutions or the flame hydrolysis of silicon halides, silicates, gypsum, alumina, titanium dioxide, talc, and mixtures thereof; and
    admixing with said at least one halogenated butyl elastomer at least one protected thiol modifier.

* * * * *